US011812113B2

(12) United States Patent
Feldman et al.

(10) Patent No.: US 11,812,113 B2
(45) Date of Patent: Nov. 7, 2023

(54) CONTENT REDIRECTION AFTER INTERRUPT

(71) Applicant: Disney Enterprises, Inc., Burbank, CA (US)

(72) Inventors: Vladislav Feldman, Manhasset Hills, NY (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/667,352

(22) Filed: Feb. 8, 2022

(65) Prior Publication Data

US 2022/0167060 A1 May 26, 2022

Related U.S. Application Data

(63) Continuation of application No. 15/469,361, filed on Mar. 24, 2017, now Pat. No. 11,284,164.

(51) Int. Cl.
*H04N 21/488* (2011.01)
*H04N 21/435* (2011.01)
(Continued)

(52) U.S. Cl.
CPC ..... *H04N 21/4882* (2013.01); *H04L 65/1083* (2013.01); *H04L 65/611* (2022.05); *H04L 65/612* (2022.05); *H04N 21/236* (2013.01); *H04N 21/23424* (2013.01); *H04N 21/262* (2013.01); *H04N 21/433* (2013.01); *H04N 21/435* (2013.01); *H04N 21/4325* (2013.01); *H04N 21/4516* (2013.01); *H04N 21/814* (2013.01); *H04N 21/8126* (2013.01); *H04N 21/8455* (2013.01)

(58) Field of Classification Search
CPC ......... H04N 21/4882; H04N 21/23424; H04N 21/236; H04N 21/262; H04N 21/4325; H04N 21/433; H04N 21/435; H04N 21/4516; H04N 21/8126; H04N 21/814; H04N 21/8455; H04L 65/1083; H04L 65/611; H04L 65/612
See application file for complete search history.

(56) References Cited

U.S. PATENT DOCUMENTS

| 2005/0251835 | A1* | 11/2005 | Scott | H04N 7/173 |
| 2009/0133055 | A1* | 5/2009 | Lock | H04N 7/025 |

(Continued)

*Primary Examiner* — Anthony Bantamoi
(74) *Attorney, Agent, or Firm* — Farjami & Farjami LLP

(57) ABSTRACT

According to one implementation, a system for redirecting to content after an interruption includes a computing platform having a hardware processor and a system memory storing a content redirection software code. The hardware processor executes the content redirection software code to track a playout status of a primary content being provided by the system, and detect a pause to playout of the primary content due to receipt of an interrupt content by the system. In addition, the hardware processor executes the content redirection software code to, during playout of the interrupt content by the system, save the playout status of the primary content at the pause. The hardware processor further executes the content redirection software code to detect completion of interrupt content playout by the system, and enable a return to the primary content after the pause.

20 Claims, 4 Drawing Sheets

(51) Int. Cl.
*H04N 21/81* (2011.01)
*H04N 21/234* (2011.01)
*H04N 21/45* (2011.01)
*H04N 21/236* (2011.01)
*H04L 65/1083* (2022.01)
*H04N 21/432* (2011.01)
*H04N 21/262* (2011.01)
*H04N 21/433* (2011.01)
*H04N 21/845* (2011.01)
*H04L 65/611* (2022.01)
*H04L 65/612* (2022.01)

(56) References Cited

U.S. PATENT DOCUMENTS

2009/0204719 A1* 8/2009 Simongini ............... G06F 15/16
2012/0331113 A1* 12/2012 Chatani ................... G06F 15/16

* cited by examiner

CONTENT REDIRECTION AFTER INTERRUPT

This application is a Continuation of U.S. patent application Ser. No. 15/469,361, filed Mar. 24, 2017.

BACKGROUND

Media players that receive and display streaming media content, such as video players, for example, can exist on many platforms. Examples of those platforms include handheld devices, Smart TVs, personal computers, and the like, as well as professional devices streaming uncompressed video.

In some instances, it may become desirable for the originator of streaming to content, whether a content provider or professional multicast source, to interrupt a primary content feed by switching the media player from the primary content feed to an alternate content feed, such as a breaking news feed, for instance. That alternate feed may be of unknown duration, but is typically intended to serve as a temporary interruption to presentation of the primary content by the media player. However, conventional media players are not configured to return to the primary content feed after the interruption, thereby undesirably compelling a user of the media player to manually navigate to and reacquire the primary content feed.

SUMMARY

There are provided systems and methods for redirecting to content after an interruption, substantially as shown in and/or described in connection with at least one of the figures, and as set forth more completely in the claims.

DETAILED DESCRIPTION

Figure 1:
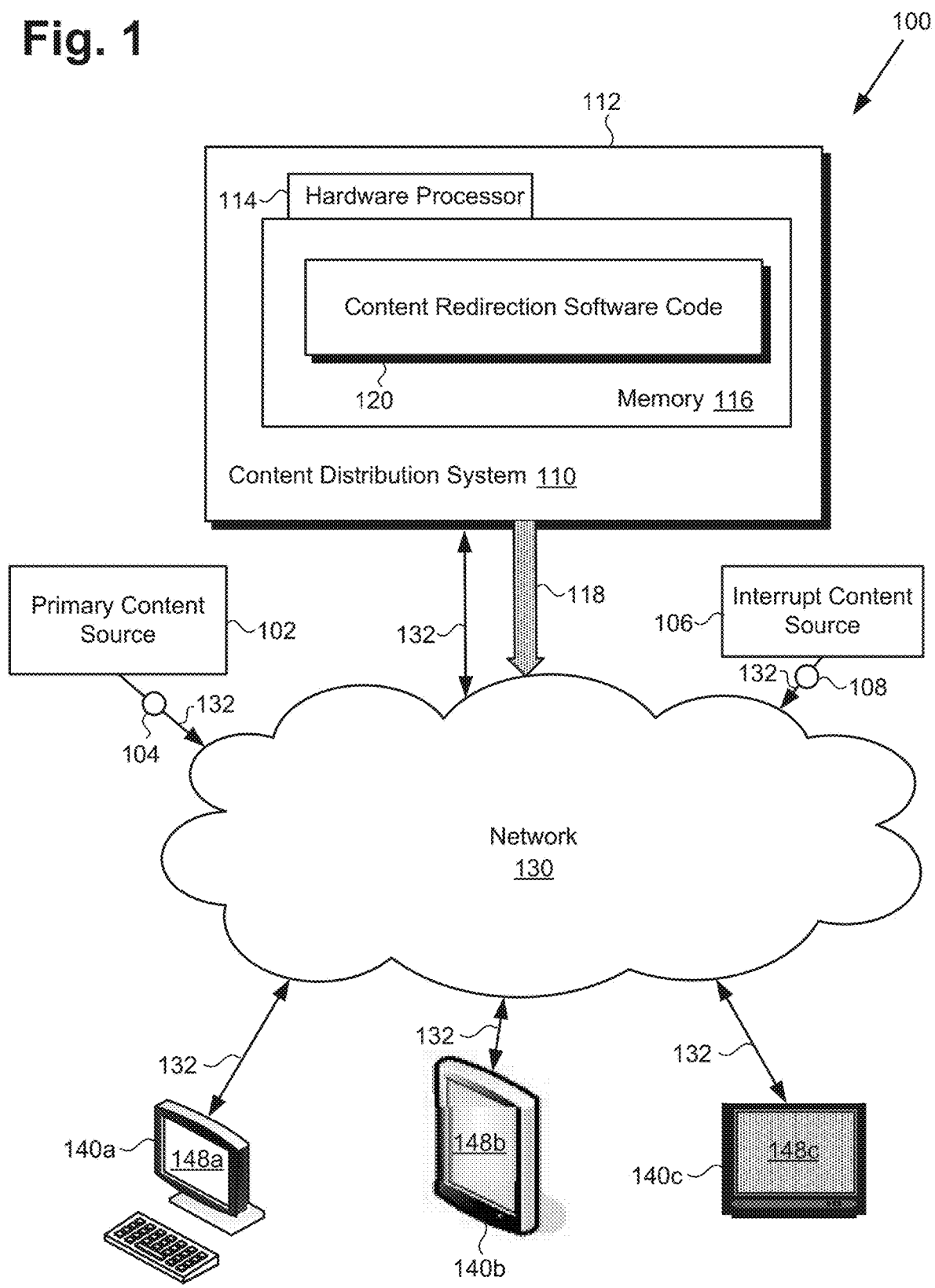
FIG. 1 shows exemplary systems for redirecting to content after an interruption, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in some instances, it may become desirable for the originator of streaming content, whether a content provider or professional multicast source, to interrupt a primary content feed by switching a media player presenting the primary content to an alternate content feed, such as a breaking news feed, for instance. That alternate feed may be of unknown duration, but is typically intended to serve as a temporary interruption to presentation of the primary content by the media player. However, and as further stated above, conventional media players are not configured to return to the primary content feed after the interruption, thereby undesirably compelling a user of the media player to manually navigate to and reacquire the primary content feed.

The present application discloses systems and methods for redirecting to content after an interruption that addresses and overcomes the deficiencies in the conventional art. By detecting a pause to playout of primary content due to receipt of interrupt content, and by saving the playout status of the primary content at the pause during playout of the interrupt content, the present solution can advantageously retain information identifying the source of the primary content. Moreover, by detecting completion of interrupt content playout and enabling a return to the primary content, the present solution advantageously provides redirection to the primary content after the interruption.

FIG. 1 shows exemplary systems for redirecting to content after an interruption, according to one implementation. As shown in FIG. 1, system environment 100 includes content distribution system 110 having computing platform 112. According to the exemplary implementation shown in FIG. 1, computing platform 112 includes hardware processor 114, and system memory 116 storing content redirection software code 120. Also shown in FIG. 1 are primary content source 102 providing primary content 104, interrupt content source 106 providing interrupt content 108, and programming stream 118 provided by content distribution system 110.

In addition, FIG. 1 shows client systems 140a, 140b, and 140c (hereinafter "client systems 140a-140c"), which may also be configured to redirect content after azo interruption. As further shown in FIG. 1, client systems 140a-1140c are interactively linked to content distribution system 1110 via communication network 130 and network communication links 132. Thus, content distribution system 110 and/or client systems 140a-140c may receive primary content 104 and interrupt content 106 from respective primary content source 102 and interrupt content source 106 via communication network 130 and net work communication links 132, In addition, or alternatively, client systems 140a-140c may receive programming stream 118 from content distribution system 110, via communication network 130 and network communication links 132. Further shown in FIG. 1 are displays 148a, 148b, and 148c (hereinafter "displays 148a-148c") of respective client systems 140a-140c.

It is noted that computing platform 112 of content distribution system 110 may be implemented using one or more content servers, which may be co-located, or may form an interactively linked but distributed system. For example, content distribution system 110 may be a cloud-based content distribution system. As a result, hardware processor 114 and system memory 116 may correspond to distributed processor and memory resources within content distribution system 110. Moreover, in some implementations, content distribution system 110 may be implemented virtually, such as in a data center. For example, in some use cases, content distribution system 110 may be implemented in software, or as virtual machines.

It is further noted that, although client systems 140a-140c are shown variously as personal computer (PC) 140a, mobile communication device 140b, and smart TV 140c, in FIG. 1, those representations are provided merely by way of example. In other implementations, for instance, any or all of client systems 140a-140c may take the form of any suitable personal communication device including a display, such as a laptop computer, tablet computer, digital media player, gaming console, or smartphone. It is also noted that displays 148a-148c may take the form of liquid crystal displays (LCDs), light-emitting diode (LED) displays, organic light-emitting diode (OLED) displays, or any other suitable display screens that perform a physical transformation of signals to light.

In one implementation, primary content source 102 may be a media entity providing TV content as primary content 104. Primary content 104 may be a linear TV program stream, for example, including an ultra high-definition (ultra HD), HD, or standard-definition (SD) baseband video signal with embedded audio, captions, time code, and other ancillary metadata, such as ratings and/or parental guidelines. In some implementations, primary content 104 may include multiple audio tracks, and may utilize secondary audio programming (SAP) and/or Descriptive Video Service (DVS), for example.

Primary content 104 may include the same source video that is broadcast to a traditional TV audience using a TV broadcasting platform (not shown in FIG. 1), which may include a conventional cable and/or satellite network, for example. As depicted in FIG. 1, primary content source 102 may find it advantageous or desirable to make primary content 104 available via an alternative distribution channel, such as communication network 130, which may take the form of a packet-switched network, for example, such as the Internet. For example, content distribution system 110 may be utilized by primary content source 102 to distribute primary content 104 as part of programming stream 118, which may be an Internet Protocol (IP) programming stream.

In various implementations, interrupt content source 106 may be affiliated with primary content source 102, or may be a third party source of interrupt content 108, such as a public service or emergency broadcast source, for example. As specific but non-limiting examples, interrupt content 108 may include one or more of breaking news, an emergency broadcast, an AMBER alert, a traffic alert, or a weather alert.

Figure 2:
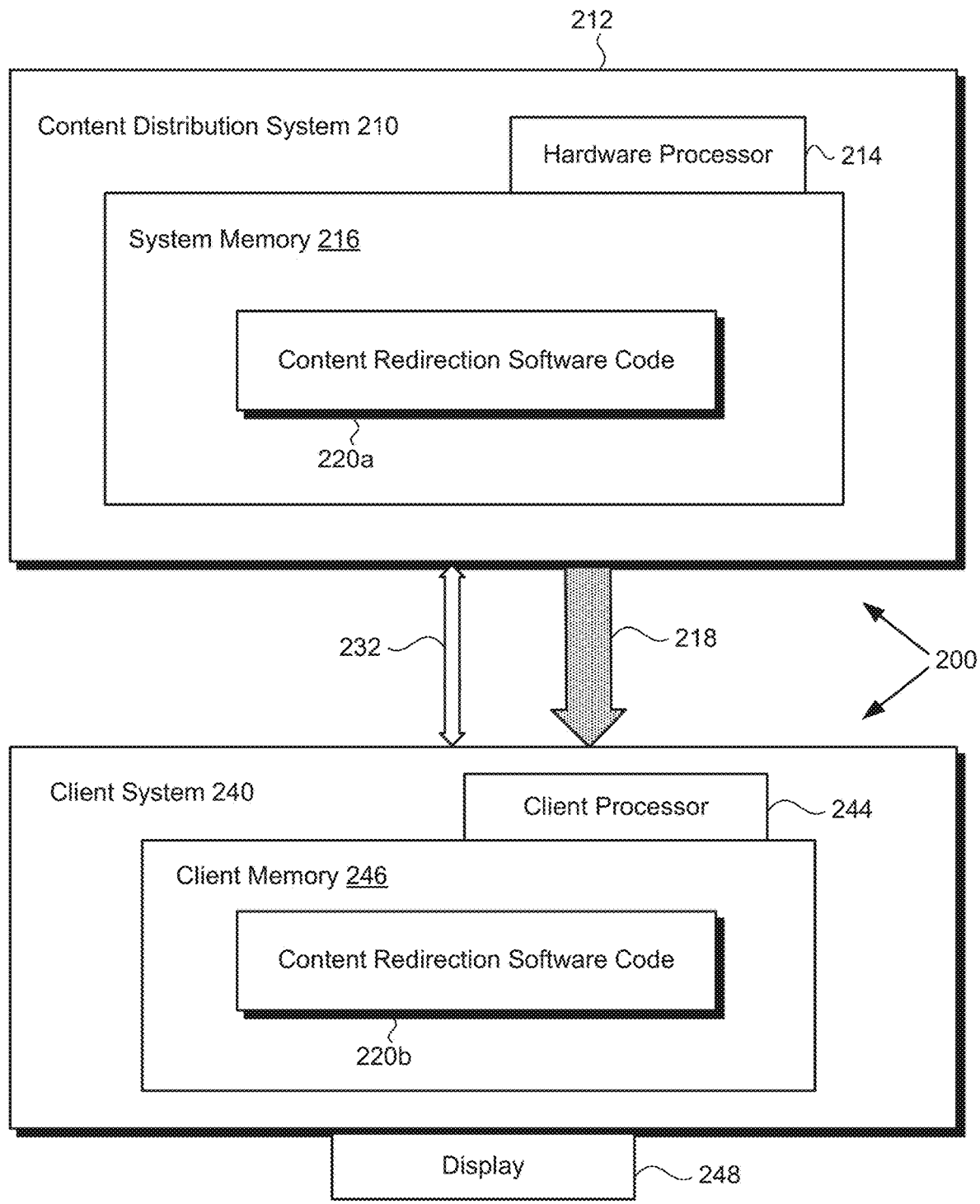
FIG. 2 shows another exemplary implementation of systems for redirecting to content after an interruption.

FIG. 2 shows another exemplary implementation of systems for redirecting to content after an interruption. System environment 200 includes content distribution system 210 having computing platform 212 interactively connected to client system 240 via network communication link 232. Computing platform 212 includes hardware processor 214, and system memory 216 storing content redirection software code 220a. As shown in FIG. 2, client system 240 includes client hardware processor 244, client system memory 246 storing content redirection software code 220b, and display 248. Also shown in FIG. 2 is programming stream 218 provided by content distribution system 210 to client system 240.

Network communication link 232, programming stream 218, and content distribution system 210, correspond respectively in general to network communication link 132, programming stream 118, and content distribution system 110, in FIG. 1. In addition, content redirection software code 220a, in FIG. 2, corresponds in general to content redirection software code 120, in FIG. 1. In other words, content redirection software code 220a and content redirection software code 120 may share any of the characteristics attributed to either corresponding feature by the present disclosure.

Client system 240 and display 248 correspond respectively in general to any of client systems 140a-140c and displays 148a-148c in FIG. 1, and those respective corresponding features may share the characteristics attributed to any corresponding feature by the present disclosure. Moreover, content redirection software code 220b corresponds to content redirection software code 120/220a and may share any of the characteristics attributed to those corresponding features by the present disclosure.

According to the exemplary implementation shown in FIG. 2, content redirection software code 220b is located in client system memory 246, having been received from content distribution system 210 via network communication link 232. In one implementation, network communication link 232 corresponds to transfer of content redirection software code 220b over a packet-switched network, such as the Internet, for example. Once transferred, for instance by being downloaded over network communication link 232, content redirection software code 220b may be persistently stored in client system memory 246 and may be executed locally on client system 240 by client hardware processor 244.

Client hardware processor 244 may be the central processing unit (CPU) for client system 240, for example, in which role client hardware processor 244 runs the operating system for client system 240 and executes content redirection software code 220b. In the exemplary implementation of FIG. 2, client system 140a-140c/240 can utilize content redirection software code 220b to redirect to primary content 104 carried by programming stream 118/218 after a pause to the playout of primary content 104 by client system 140a-140c/240 due to diversion to interrupt content 108.

Figure 3:
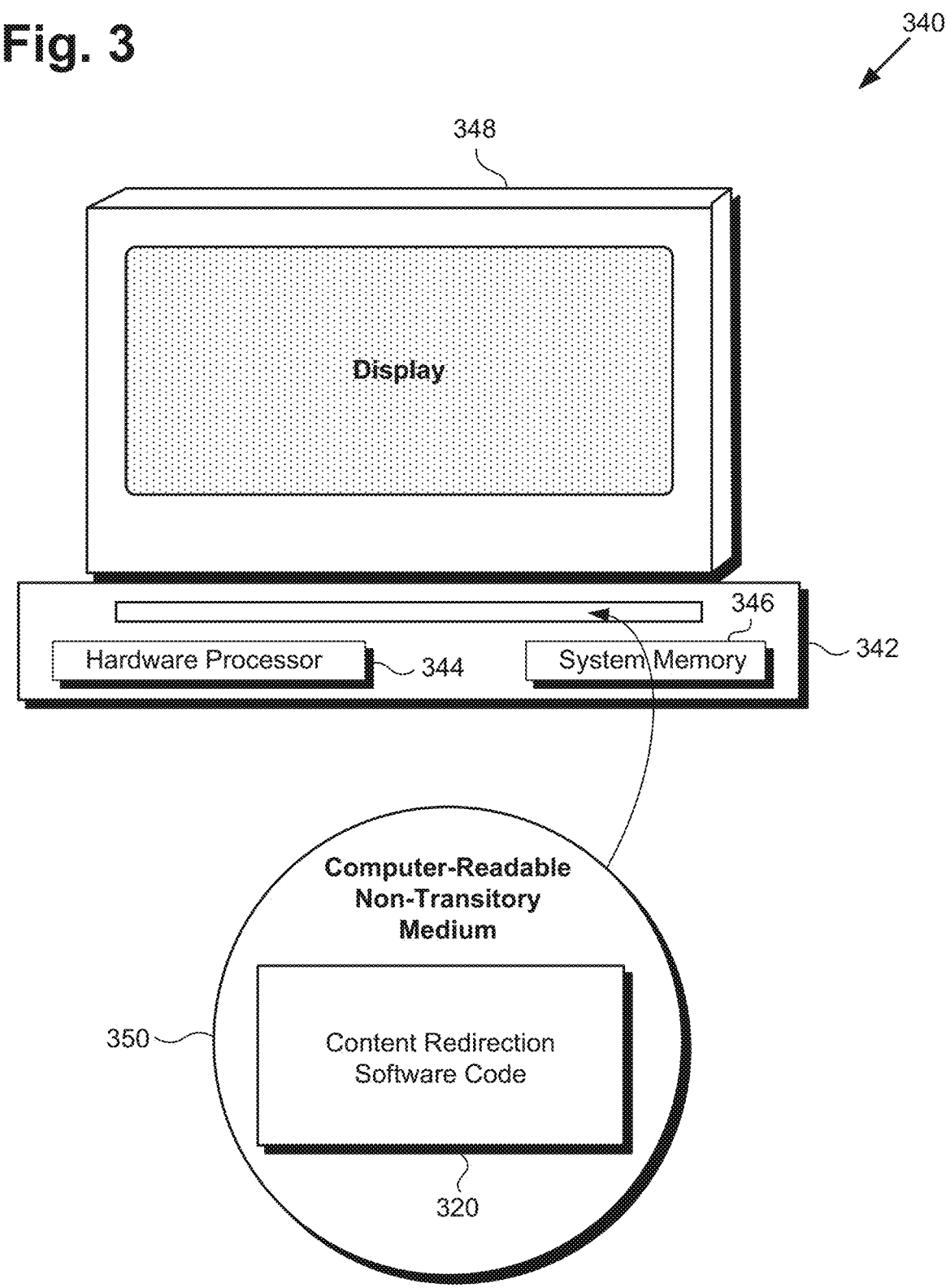
FIG. 3 shows an exemplary system and a computer-readable non-transitory medium including instructions enabling execution of a method for redirecting to content after an interruption, according to one implementation.

FIG. 3 shows exemplary client system 340 and computer-readable non-transitory medium 350 including instructions enabling execution of a method for redirecting to content after an interruption, according to one implementation. Client system 340 includes computer 342 having client hardware processor 344 and client system memory 346, interactively linked to display 348. Display 348 may take the form of an LCD, LED display, OLED display, or another suitable display screen that performs a physical transformation of signals to light. Client system 340 including display 348, and computer 342 having client hardware processor 344 and client system memory 346, corresponds in general to any or all of client systems 140a-140c/240, in FIG. 1.

Also shown in FIG. 3 is computer-readable non-transitory medium 350 having content redirection software code 320 stored thereon. The expression "computer-readable non-transitory medium," as used in the present application, refers to any medium, excluding a carrier wave or other transitory signal, that provides instructions to client hardware processor 344 of client system 340. Thus, a computer-readable non-transitory medium may correspond to various types of media, such as volatile media and non-volatile media, for example. Volatile media may include dynamic memory, such as dynamic random access memory (dynamic RAM), while non-volatile memory ray include optical, magnetic, or electrostatic storage devices. Common forms of computer-readable non-transitory media include, for example, optical discs, RAM, programmable read-curly memory (PROM), erasable PROM (EPROM), and FLASH memory.

According to the implementation shown in FIG. 3, computer-readable non-transitory medium 350 provides content redirection software code 320 for execution by client hardware processor 344 of client system 340. Content redirection software code 320 corresponds in general to content redirection software code 120/220a/220b, in FIGS. 1/2, and is capable of performing all of the operations attributed to those corresponding features by the present disclosure. In other words, in implementations in which client hardware processor 244/344 of client systems 140a-140c/240/340 access computer-readable non-transitory medium 350 and execute content redirection software code 220b/320, client systems 140a-140c/240/340 may perform any of the actions attributed to content distribution system 110/210 by the present disclosure.

Figure 4:
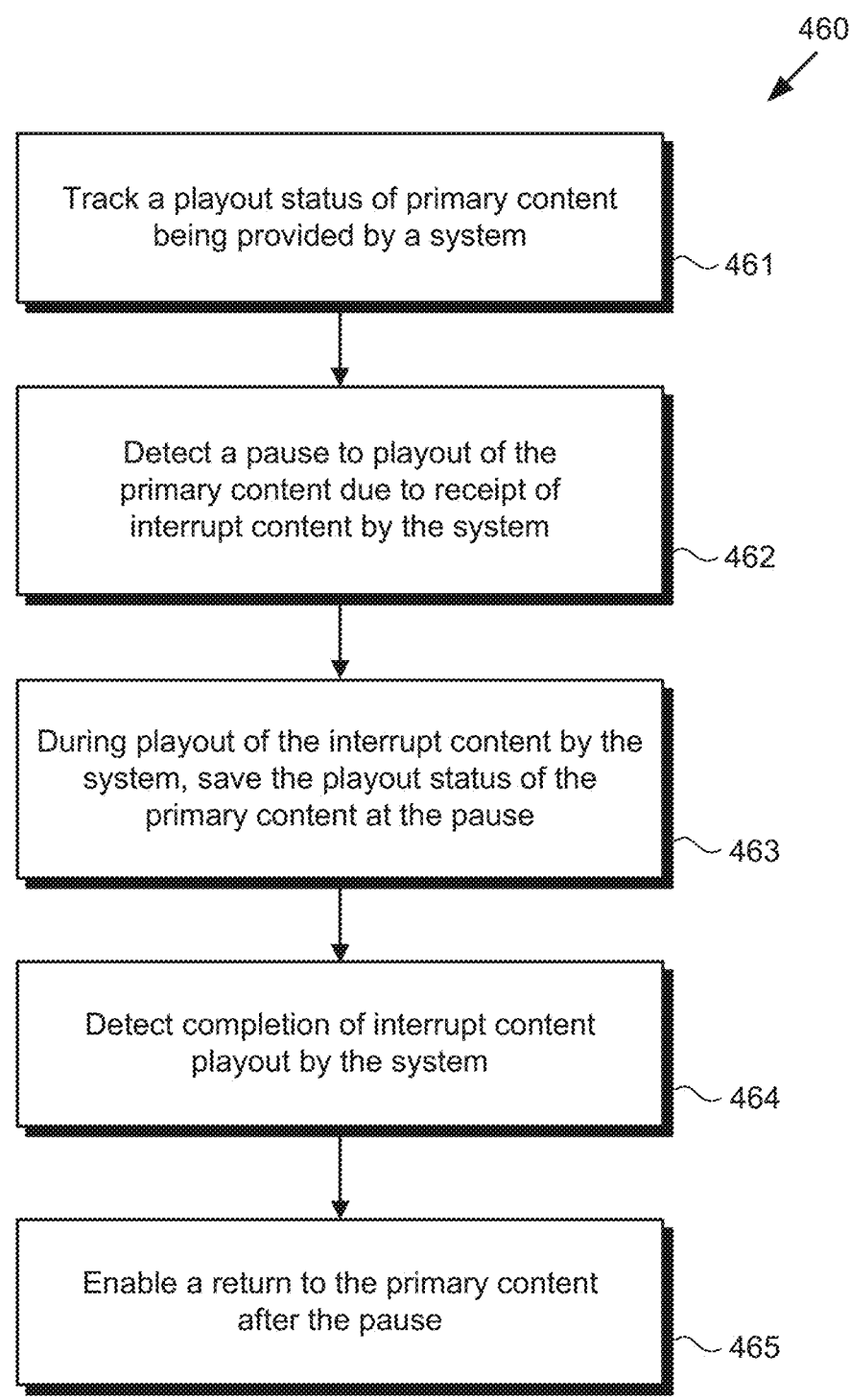
FIG. 4 shows a flowchart presenting an exemplary method for redirecting to content after an interruption, according to one implementation.

The functionality of content redirection software code 120/220a/220b/320 will be further described by reference to FIG. 4. FIG. 4 shows flowchart 460 presenting an exemplary method for use by a system, such as system 110/210/140a-140c/240/340, for redirecting to content after an interruption.

Referring now to FIG. 4 in combination with FIGS. 1, 2, and 3, flowchart 460 begins with tracking a playout status of primary content 104 being provided by a system (action 461). By way of example, in some implementations, primary content 104 may be received by content distribution system 110/210 from primary content source 102 via communication network 130, and may be provided as part of programming stream 118/218 to client systems 140a-140c/240/340, also via communication network 130. In those implementations, for example, providing primary content 104 by content distribution system 110/210 may include transmitting programming stream 118/218 including primary content 104 to client devices 140a-140c/240/340.

In those implementations in which primary content 104 is provided by content distribution system 110/210 as part of programming stream 118/218, the playout status of primary content 104 may include the network address of primary content source 102 on communication network 1130. That is to say, in implementations in which communication network 130 takes the form of a packet-switched network, such as the Internet, the playout status of primary content 104 may include the packet-switched network address (e.g., IP address) of primary content source 102. Primary content 104 may be provided as part of programming stream 118/218 by content distribution system 110/210 using content redirection software code 120/220a, executed by hardware processor 114/214.

As an alternative example, when primary content 104 is received by client systems 140a-140c/240/340 as part of programming stream 118/218 from content distribution system 110/210, providing primary content 104 by client systems 140a-140c/240/340 may include displaying primary content 104 on respective displays 148a-148c/248/348. In those implementations, the playout status of primary content 104 may include one or both of the network address of content distribution system 110/210 and the network address of primary content source 102 on communication network 1130. Thus, where communication network 130 takes the form of a packet-switched network, the playout status of primary content 104 may include the packet-switched network address (e.g., IP address) of content distribution system 110/210 and or primary content source 102.

In those exemplary implementations in which primary content 104 is provided by being displayed on displays 148a-148c/248/348 of respective client systems 140a-140c/240/34, primary content 104 may be provided by respective client systems 140a-140c/240/340 using content redirection software code 220b/320, executed by client hardware processor 240/340.

As noted above, primary content source 102 may be a media entity providing TV content as primary content 104. Thus, and as further noted above, primary content 104 may be a linear TV program stream, for example, including an ultra HD, HD, or SD baseband video signal with embedded audio, captions, time code, and other ancillary metadata, such as ratings and/or parental guidelines. Moreover, in some implementations, primary content 104 may include multiple audio tracks, and may utilize SAP and/or DVS, for example.

Flowchart 460 continues with detecting a pause to playout of primary content 104 due to receipt of interrupt content 108 by the system (action 462). As noted above, in some implementations, primary content 104 is provided to client systems 140a-140c/240/340 by content distribution system 110/210. In such implementations, playout of primary content 104 may correspond to transmitting of programming stream 118/218 by content distribution system 110/210. Furthermore, in those implementations, content distribution system 110/210 may be configured to pause programming stream 118/218 when interrupt content 108 is received, in order to provide interrupt content 108 to client systems 140a-140c/240/340 as a temporary substitute for programming stream 118/218 including primary content 104.

Interrupt content 108 may be received by content distribution system 110/210 from interrupt content source 106, via communication network 130. The pause to playout of primary content 104 in those implementations, i.e., pausing transmission of programming stream 118/2118 by content distribution system 110/210, may be detected using content redirection software code 120/220a of content distribution system 110/210, executed by hardware processor 114/214.

By contrast, when client systems 140a-140c/240/340 are the systems providing primary content 104, playout of primary content 104 may correspond to displaying primary content on displays 148a-148c/248/348 of respective client systems 140a-140c/240/340. In those implementations, client systems 140a-140c/240/340 may be configured to pause playout, i.e., display, of primary content 104 when interrupt content 108 is received, in order to display interrupt content 108 on respective displays 148a-148c/248/348 as a temporary substitute for primary content 104. Interrupt content 108 may be received by client systems 140a-140c/240/340 via communication network 130, either from content distribution system 110/210 or directly from interrupt content source 106. The pause to playout of primary content 104 in those implementations, i.e., pausing display of primary content 104 by client systems 140a-140c/240/340, may be detected using content redirection software code 220b/320 of client systems 140a-140c/240/340, executed by client hardware processor 240/340.

As noted above, interrupt content source 106 may be affiliated with primary content source 102, or may be a third party source of interrupt content 108, such as a public service or emergency broadcast source, for example. As further noted above, interrupt content 108 may include one or more of breaking news, an emergency broadcast, an AMBER alert, traffic alert, or a weather alert.

Flowchart 460 continues with, during playout of interrupt content 108 by the system, saving the playout status of primary content 104 at the pause (action 463). As noted above, in various implementations, the playout status of primary content 104 may include the packet-switched network address (e.g., IP address) of primary content source 104 and/or content distribution system 110/210. In addition, the playout status of primary content 104 at the pause may include identification of a playout pause point substantially coinciding with an elapsed time location frame location within programming stream 118/218 at the pause.

As discussed above, in some implementations, transmitting of programming stream 118/218 may be paused by content distribution system 110/210 due to receipt of interrupt content 108 by content distribution system 110/210. In those implementations, saving of the playout status of primary content 104 at the pause may be performed using content redirection software code 120/220a of content distribution system 110/210 executed by hardware processor 114/214. As further discussed above, in other implementations, displaying of primary content 104 may be paused by client systems 140a-140c/240/340 due to receipt of interrupt content 108 by client systems 140a-140c/240/340. In those implementations, saving of the playout status of primary content 104 at the pause may be performed using content redirection software code 220b/320 of client systems 140a-140c/240/340, executed by client hardware processor 240/340.

Flowchart 460 continues with detecting completion of interrupt content 108 playout by the system (action 464). In some implementations, transmitting of programming stream 118/2118 may be paused by content distribution system 110/210 during playout of interrupt content 108. In those implementations, detecting completion of playout of interrupt content 108 may be performed using content redirection software code 120/220a of content distribution system 110/210, executed by hardware processor 114/214. In other implementations, displaying of primary content 104 may be paused by client systems 140a-140c/240/340 during playout of interrupt content 108, i.e., displaying of interrupt content 108, by client systems 140a-140c/240/340. In those implementations, detecting completion of playout of interrupt content 108 may be performed using content redirection software code 220b/320 of client systems 140a-140c/240/340, executed by client hardware processor 240/340.

Flowchart 460 can conclude with enabling a return to primary content 104 after the pause (action 465). As noted above, in some implementations, transmitting of programming stream 118/218 may be paused by content distribution system 110/210 during playout of interrupt content 108. In those implementations, subsequent to the pause, and after completion of playout of interrupt content 108, content distribution system 110/210 may enable a return to primary content 104 by navigating to the network address of primary content source 102 on communication network 130. In other words, in implementations in which communication network 130 takes the form of a packet-switched network, such as the Internet, content distribution system 110/210 may enable a return to primary content 104 by navigating to the packet-switched network address (e.g., IP address) of primary content source 102.

In some implementations, moreover, content distribution system 110/210 may enable a return to primary content 104 by resuming primary content 104 at the playout pause point of primary content 104 substantially coinciding with the pause, i.e., the playout pause point substantially coinciding with an elapsed time location or frame location within programming stream 118/218 at the pause. Return or redirection to primary content 104 may be enabled by content distribution system 110/210 using content redirection software code 120/220a, executed by hardware processor 114/214.

In other words, programming stream 118/218 including primary content 104 may be sourced by content distribution system 110/210, which may be a cloud based system implemented using virtual machines. In some instances, it may be necessary or desirable to interrupt programming stream 118/218 with alternate content provided by interrupt content source 106, and subsequently to return to programming stream 118/218 at the break point at which programming stream 118/218 was interrupted. That functionality of content distribution system 110/210 is enabled by content redirection software code 120/220a, executed by hardware processor 114/214.

Alternatively, or in addition, in some implementations, displaying of primary content 104 may be paused by client systems 140a-140c/240/340 during playout of interrupt content 108. In those implementations, subsequent to the pause, and after completion of playout of interrupt content 108, client systems 140a-140c/240/340 may enable a return to primary content 104 by navigating to the network address of content distribution system 110/210 on communication network 130, or to the network address of primary content source 102 on communication network 130. Thus, in implementations in which communication network 130 takes the form of a packet-switched network, such as the Internet, client systems 140a-140c/240/340 may enable a return to primary content 104 by navigating to the packet-switched network address (e.g., IP address) of content distribution system 110/210 or primary content source 102.

In some implementations, client systems 140a-140c/240/340 may enable a return to primary content 104 by resuming programming stream 118/218 at the playout pause point of primary content 104 substantially coinciding with the pause, i.e., the playout pause point substantially coinciding with an elapsed time location or frame location within programming stream 118/218 at the pause. Return or redirection to primary content 104 may be enabled by client systems 140a-140c/240/340 using content redirection software code 220b/320, executed by client hardware processor 240/340.

That is to say, it may be necessary or desirable for client systems 140a-140c/240/340 to interrupt presentation of programming stream 118/218 with alternate content provided by interrupt, content source 106, and subsequently to return to programming stream 118/218 at the break point at which programming stream 118/218 was interrupted. That functionality of client systems 140a-140c/240/340 is enabled by content redirection software code 220b/320, executed by client hardware processor 240/340.

Thus, the present application discloses systems and methods for redirecting to content after an interruption that addresses and overcomes the deficiencies in the conventional art. By detecting a pause to playout of primary content due to receipt of interrupt content, and by saving the playout states at the pause during playout of the interrupt content, the present solution can advantageously retain information identifying the source of the primary content. Moreover, by detecting completion of interrupt content playout and enabling a return to the primary content, the present solution advantageously provides redirection to the primary content after the interruption.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content distribution system comprising:
a computing platform including a hardware processor and a system memory;
a software code stored in the system memory;
the hardware processor configured to execute the software code to:
playout a primary content to a client device, the primary content being received by the content distribution system over a network from a first source and carried by a programming stream to the client device over the network, wherein the first source is a media entity provider of the primary content;
track a playout status, including a frame location, of the primary content being played out to the client device over the network;
detect a pause to the playout of the primary content;
save the playout status being tracked, the saved playout status including the frame location and a first address of the first source of the primary content when paused;
playout a secondary content to the client device as a substitute content for the primary content;
detect completion of the playout of the secondary content to the client device; and
in response to detecting the completion, resume the playout of the primary content to the client device at the saved frame location by receiving the primary content from the saved first address of the first source of the primary content.

2. The system of claim 1, wherein the frame location of the saved playout status coincides with the pause.

3. The system of claim 1, wherein the secondary content comprises breaking news.

4. The system of claim 1, wherein the secondary content comprises an emergency broadcast.

5. The system of claim 1, wherein the secondary content comprises at least one of an AMBER alert, a traffic alert, or a weather alert.

6. The system of claim 1, wherein the network comprises a packet-switched network.

7. The system of claim 1, wherein the first source is a multicast source.

8. A method for use by a content distribution system in communication with a client device over a network, the method comprising:
playing out a primary content to a client device, the primary content being received from a first source over the network and carried by a programming stream to the client device over the network, wherein the first source is a media entity provider of the primary content;
tracking a playout status, including a frame location, of the primary content being played out to the client device over the network;
detecting a pause to playing out of the primary content;
saving the playout status being tracked, the saved playout status including the frame location and a first address of the first source of the primary content when paused;
playing out a secondary content to the client device as a substitute content for the primary content;
detecting completion of playing out of the secondary content to the client device; and
in response to detecting the completion, resuming playing out of the primary content to the client device at the saved frame location by receiving the primary content from the saved first address of the first source of the primary content.

9. The method of claim 8, wherein the frame location of the saved playout status coincides with the pause.

10. The method of claim 8, wherein the secondary content comprises breaking news.

11. The method of claim 8, wherein the secondary content comprises an emergency broadcast.

12. The method of claim 8, wherein the secondary content comprises at least one of an AMBER alert, a traffic alert, or a weather alert.

13. The method of claim 8, wherein the network comprises a packet-switched network.

14. The method of claim 8, wherein the first source is a multicast source.

15. A content distribution system comprising:
a computing platform including a hardware processor and a system memory;
a software code stored in the system memory;
the hardware processor configured to execute the software code to:
playout a primary content to a client device, the primary content being received by the content distribution system over a network from a first source and carried by a programming stream to the client device over the network, wherein the first source is a media entity provider of the primary content;
track a playout status, including a location, of the primary content being played out to the client device over the network;
detect a pause to the playout of the primary content, due to receipt of an interrupt content from a second source;
save the playout status being tracked, due to receipt of the interrupt content from the second source, the saved playout status including the location and a first network address of the first source of the primary content when paused;
playout the interrupt content to the client device carried by the programming stream over the network as a substitute content for the primary content, the interrupt content being received from a second network address of the second source;
detect completion of the playout of the interrupt content to the client device; and
in response to detecting the completion, resume the playout of the primary content to the client device at the saved location by receiving the primary content from the saved first network address of the first source of the primary content.

16. The system of claim 15, wherein the interrupt content comprises breaking news.

17. The system of claim 15, wherein the interrupt content comprises an emergency broadcast.

18. The system of claim 15, wherein the interrupt content comprises at least one of an AMBER alert, a traffic alert, or a weather alert.

19. The system of claim 15, wherein the network comprises a packet-switched network.

20. The system of claim 15, wherein the first source is a multicast source.

* * * * *